US011996078B2

(12) United States Patent
Warkentin

(10) Patent No.: US 11,996,078 B2
(45) Date of Patent: May 28, 2024

(54) REAL-TIME DETECTION OF FEEDBACK INSTABILITY

(71) Applicant: Bose Corporation, Framingham, MA (US)

(72) Inventor: David J. Warkentin, Boston, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 17/881,982

(22) Filed: Aug. 5, 2022

(65) Prior Publication Data

US 2024/0046910 A1 Feb. 8, 2024

(51) Int. Cl.
*G10K 11/178* (2006.01)

(52) U.S. Cl.
CPC .................. *G10K 11/17853* (2018.01); *G10K 2210/3026* (2013.01); *G10K 2210/3027* (2013.01)

(58) Field of Classification Search
CPC ....... G10K 11/17819; G10K 11/17827; G10K 11/1783; G10K 11/17833; G10K 11/17837; G10K 11/17885; G10K 2210/3053
See application file for complete search history.

(56) References Cited

U.S. PATENT DOCUMENTS

| | | | | |
|---|---|---|---|---|
| 10,244,306 | B1 * | 3/2019 | Ku | H04R 3/02 |
| 10,540,954 | B2 | 1/2020 | Kumar et al. | |
| 10,748,521 | B1 | 8/2020 | Mulvey et al. | |
| 10,964,304 | B2 | 3/2021 | Barnes | |

OTHER PUBLICATIONS

International Search Report and Written Opinion dated Dec. 5, 2023 for International Application No. PCT/US2023/029427.

Hober Sven et al.: "Real.—Time Detection of Unstable Control. Loop Behavior in a Feedback Active Noise Cancellation System for In-Ear Headphones", A—A Engineering (Eng), [Online] vol. 07, No. 12, Dec. 17, 2015 (Dec. 17, 2015), pp. 796-802, XP093102150, ISSN: 1947-3931, DOI: 10.4236/eng.2015.712069 Retrieved from the Internet: URL: https://www.scirp.org/pdf/ENG_2015121717451889.pdf> [retrieved on Nov. 16, 2023] abstract pp. 796-802.

* cited by examiner

*Primary Examiner* — Kile O Blair

(57) ABSTRACT

A playback audio signal is combined with a feedback signal from a feedback microphone to provide a first combined signal. The first combined signal is filtered with a feedback filter to provide a driver command signal. The driver command signal is provided to an acoustic transducer for transduction to acoustic energy. The first combined signal is compared with the feedback signal to detect a feedback instability based upon the comparison.

18 Claims, 5 Drawing Sheets

REAL-TIME DETECTION OF FEEDBACK INSTABILITY

BACKGROUND

Various audio devices incorporate active noise reduction (ANR) features, also known as active noise control or cancellation (ANC), in which one or more microphones detect sound, such as exterior acoustics captured by a feedforward microphone or interior acoustics captured by a feedback microphone. Signals from a feedforward microphone and/or a feedback microphone are processed to provide anti-noise signals to be fed to an acoustic transducer (e.g., a speaker, driver) to counteract noise that may otherwise be heard by a user. Feedback microphones pick up acoustic signals produced by the driver, and thereby form a closed loop system that could become unstable at times or under certain conditions. Various audio systems that may provide feedback noise reduction include, for example, headphones, earphones, headsets and other portable or personal audio devices, as well as automotive systems to reduce or remove engine and/or road noise, office or environmental acoustic systems, and others. In various situations it is therefore desirable to detect when a condition of feedback instability exists.

SUMMARY

All examples and features mentioned below can be combined in any technically possible way.

In one aspect, a playback audio signal is combined with a feedback signal from a feedback microphone to provide a first combined signal. The first combined signal is filtered with a feedback filter to provide a driver command signal. The driver command signal is provided to an acoustic transducer for transduction to acoustic energy. The first combined signal is compared with the feedback signal to detect a feedback instability based upon the comparison.

Implementations may include one of the following features, or any combination thereof.

In some implementations, combining the playback audio signal with the feedback signal includes filtering the playback audio signal with an equalization filter to provide a filtered playback signal and combining the filtered playback signal with the feedback signal to provide the first combined signal.

In certain implementations, combining the playback audio signal with the feedback signal includes: (i) filtering a feedforward signal from a feedforward microphone with an aware mode filter to provide an aware mode signal; and (ii) combining the aware mode signal, the filtered playback signal, and the feedback signal to provide the first combined signal.

In some cases, combining the playback signal with the feedback signal includes: (i) filtering the feedforward signal with a feedforward filter to provide a feedforward noise cancellation signal; and (ii) combining the feedforward noise cancellation signal, the aware mode signal, and the filtered playback signal with the feedback signal to provide the first combined signal.

In certain cases, combining the playback signal with the feedback signal includes: (i) combining the feedforward noise cancellation signal, the aware mode signal, and the filtered playback signal to provide a second combined signal; and (ii) combining the second combined signal with the feedback signal to provide the first combined signal.

In some examples, in response to detecting the feedback instability, the driver command signal is filtered with a first notch filter to provide a filtered driver command signal, and the filtered driver command signal is provided to an acoustic transducer for transduction to acoustic energy.

In certain examples, in response to detecting the feedback instability, the playback audio signal is filtered with a second notch filter.

In some implementations the steps of combining the playback audio signal with the feedback signal and filtering the first combined signal with the feedback filter are performed on a first processing component and the step of comparing the first combined signal with the feedback signal to detect the feedback instability is performed on a second processing component.

In another aspect, a playback audio signal is filtered with an equalization filter to provide a filtered playback signal. A feedforward signal from a feedforward microphone is filtered with an aware mode filter to provide an aware mode signal. The aware mode signal and the filtered playback signal are combined to provide a first combined signal. The feedforward signal is filtered with a feedforward filter to provide a feedforward noise cancellation signal. The feedforward noise cancellation signal and the first combined signal are combined to provide a second combined signal. The second combined signal is combined with a feedback signal from a feedback microphone to provide a third combined signal. The third combined signal is filtered with a feedback filter to provide a driver command signal. The driver command signal is provided to an acoustic transducer for transduction to acoustic energy. The third combined signal is compared with the feedback signal to detect a feedback instability based upon the comparison.

Implementations may include one of the above and/or below features, or any combination thereof.

According to another aspect, a feedback signal from a feedback microphone is filtered with a feedback noise cancellation filter to provide a feedback noise cancellation signal the feedback noise cancellation signal being related to the feedback signal by a first transfer function. A playback audio signal is combined with the feedback noise cancellation signal to provide a driver command signal. The driver command signal is provided to an acoustic transducer for transduction to acoustic energy. The driver command signal is filtered with a first inverse filter to provide a reference signal, the first inverse filter being configured to have a second transfer function that is the inverse of the first transfer function. The feedback noise cancellation signal is filtered with a second inverse filter to provide an estimate of the feedback signal, the second inverse filter being configured to have a third transfer function that is the inverse of the first transfer function. The reference signal is compared with the estimate of the feedback signal to detect a feedback instability based upon the comparison.

Implementations may include one of the above and/or below features, or any combination thereof.

In some implementations, combining a playback audio signal with the feedback noise cancellation signal includes filtering the playback audio signal with an equalization filter to provide a filtered playback signal and combining the filtered playback signal with the feedback noise cancellation signal to provide the driver command signal.

In certain implementations, combining the playback audio signal with the feedback noise cancellation signal includes: (i) filtering a feedforward signal from a feedforward microphone with an aware mode filter to provide an aware mode signal; and (ii) combining the aware mode signal, the filtered playback signal, and the feedback noise cancellation signal to provide the driver command signal.

In some examples, combining the playback signal with the feedback noise cancellation signal includes filtering the feedforward signal with a feedforward filter to provide a feedforward noise cancellation signal and combining the feedforward noise cancellation signal, the aware mode signal, and the filtered playback signal with the feedback noise cancellation signal to provide the driver command signal.

In certain examples, combining the playback signal with the feedback noise cancellation signal includes: (i) combining the feedforward noise cancellation signal, the aware mode signal, and the filtered playback signal to provide a first combined signal; and (ii) combining the first combined signal with the feedback noise cancellation signal to provide the driver command signal.

In some implementations, in response to detecting the feedback instability, the feedback noise cancellation signal is filtered with a first notch filter to provide a filtered feedback noise cancellation signal.

In certain implementations, in response to detecting the feedback instability, the playback audio signal is filtered with a second notch filter.

In some cases, the steps of filtering the feedback signal and combining the playback audio signal with the feedback noise cancellation signal are performed on a first processing component and the steps of filtering the driver command signal with the first inverse filter; filtering the feedback noise cancellation signal with the second inverse filter; and comparing the reference signal with the estimate of the feedback signal are performed on a second processing component.

In yet another aspect, a playback audio signal is filtered with an equalization filter to provide a filtered playback signal. A feedforward signal from a feedforward microphone is filtered with an aware mode filter to provide an aware mode signal. The aware mode signal and the filtered playback signal are combined to provide a first combined signal. The feedforward signal is filtered with a feedforward filter to provide a feedforward noise cancellation signal. The feedforward noise cancellation signal and the first combined signal are combined to provide a second combined signal. A feedback signal from a feedback microphone is filtered with a feedback noise cancellation filter to provide a feedback noise cancellation signal. The feedback noise cancellation signal is related to the feedback signal by a first transfer function. The second combined signal is combined with the feedback noise cancellation signal to provide a driver command signal. The driver command signal is provided to an acoustic transducer for transduction to acoustic energy. The driver command signal is filtered with a first inverse filter to provide a reference signal. The first inverse filter is configured to have a second transfer function that is the inverse of the first transfer function. The feedback noise cancellation signal is filtered with a second inverse filter to provide an estimate of the feedback signal. The second inverse filter is configured to have a third transfer function that is the inverse of the first transfer function. The reference signal is compared with the estimate of the feedback signal to detect a feedback instability based upon the comparison.

Implementations may include one of the above features, or any combination thereof.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, identical or nearly identical components illustrated in various figures may be represented by identical or similar numerals. For purposes of clarity, not every component may be labeled in every figure. In the figures.

DETAILED DESCRIPTION

Figure 1:
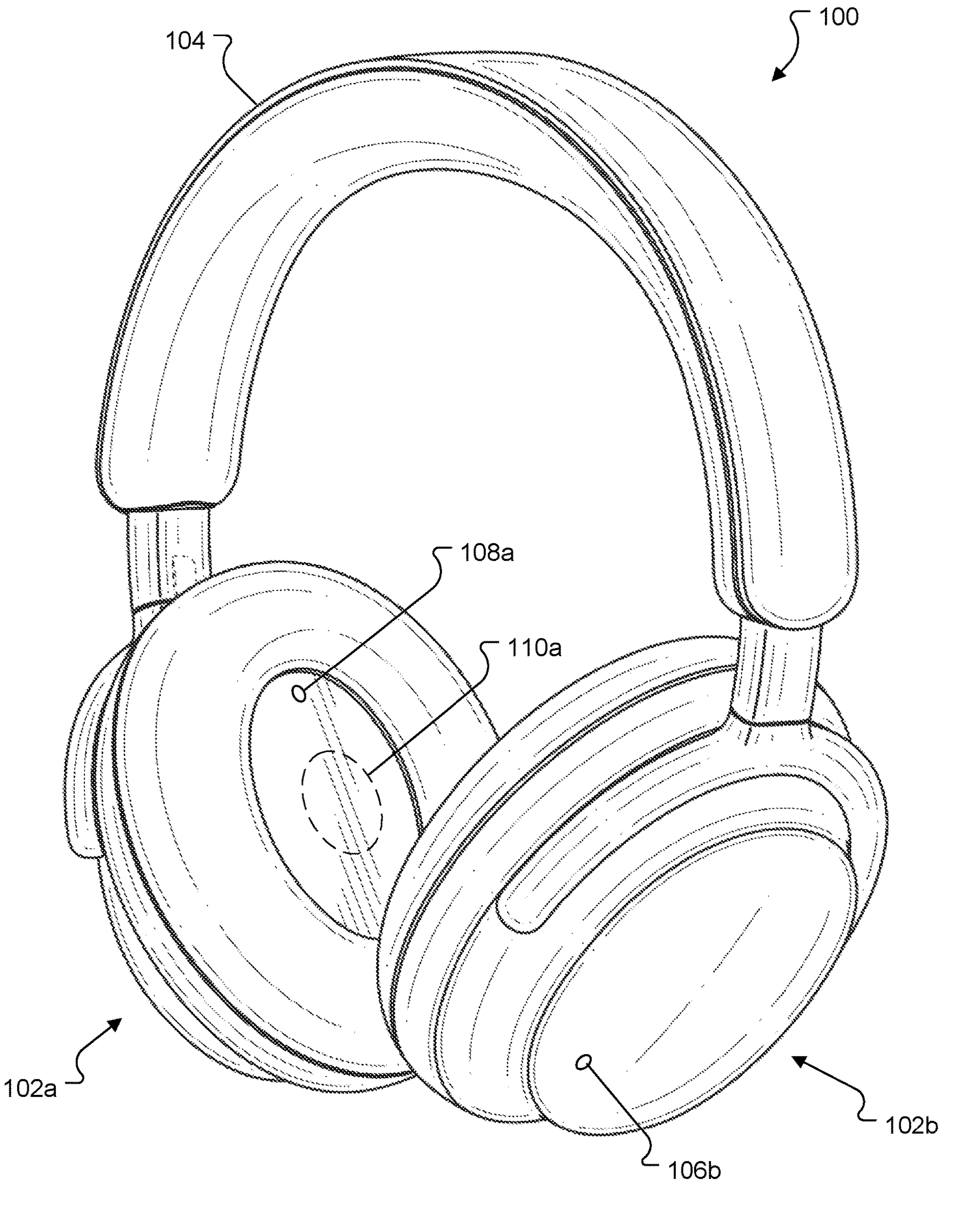
FIG. 1 is a perspective view of one example headset form factor.

Aspects of the present disclosure are directed to noise cancelling headphones, headsets, or other audio systems, and methods, that detect instability in the noise canceling system. Noise cancelling systems operate to reduce acoustic noise components heard by a user of the audio system. Noise cancelling systems may include feedforward and/or feedback characteristics. A feedforward component detects noise external to the headset (e.g., via an external microphone) and acts to provide an anti-noise signal to counter the external noise expected to be transferred through to the user's ear. A feedback component detects acoustic signals reaching the user's ear (e.g., via an internal microphone) and processes the detected signals to counteract any signal components not intended to be part of the user's acoustic experience. Examples disclosed herein may be coupled to, or placed in connection with, other systems, through wired or wireless means, or may be independent of any other systems or equipment.

The systems and methods disclosed herein may include or operate in, in some examples, headsets, headphones, hearing aids, or other personal audio devices, as well as acoustic noise reduction systems that may be applied to home, office, or automotive environments. Throughout this disclosure the terms "headset," "headphone," "earphone," and "headphone set" are used interchangeably, and no distinction is meant to be made by the use of one term over another unless the context clearly indicates otherwise. Additionally, aspects and examples in accord with those disclosed herein are applicable to various form factors, such as in-ear transducers or earbuds and on-ear or over-ear headphones, and others.

Examples disclosed may be combined with other examples in any manner consistent with at least one of the principles disclosed herein, and references to "an example,"

"some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For various components described herein, a designation of "a" or "b" in the reference numeral may be used to indicate "right" or "left" versions of one or more components. When no such designation is included, the description is without regard to the right or left and is equally applicable to either of the right or left, which is generally the case for the various examples described herein. Additionally, aspects and examples described herein are equally applicable to monaural or single-sided personal acoustic devices and do not necessarily require both of a right and left side.

FIG. 1 illustrates a headset 100. The headset 100 includes a right earpiece 102*a* and a left earpiece 102*b*, intercoupled by a supporting structure 104 (e.g., a headband) to be worn by a user. In some examples, two earpieces 102 may be independent of each other, not intercoupled by a supporting structure. In some cases, the two earpieces 102 may be in the form of in-ear headphones (e.g., earbuds). Each earpiece 102 may include one or more microphones, such as a feedforward microphone 106 and/or a feedback microphone 108. The feedforward microphone 106 may be configured to sense acoustic signals external to the earpiece 102 when properly worn, e.g., to detect acoustic signals in the surrounding environment before they reach the user's ear. The feedback microphone 108 may be configured to sense acoustic signals internal to an acoustic volume formed with the user's ear when the earpiece 102 is properly worn, e.g., to detect the acoustic signals reaching the user's ear. Each earpiece also includes a driver 110*a*, 110*b* (collectively 110), which is an acoustic transducer for conversion of, e.g., an electrical signal, into an acoustic signal that the user may hear. In various examples, one or more drivers may be included in an earpiece, and an earpiece may in some cases include only a feedforward microphone or only a feedback microphone.

While the reference numerals 106 and 108 are used to refer to one or more microphones, the visual elements illustrated in the figures may, in some examples, represent an acoustic port wherein acoustic signals enter to ultimately reach such microphones, which may be internal and not physically visible from the exterior. In examples, one or more of the microphones 106, 108 may be immediately adjacent to the interior of an acoustic port or may be removed from an acoustic port by a distance and may include an acoustic waveguide between an acoustic port and an associated microphone.

Figure 2:
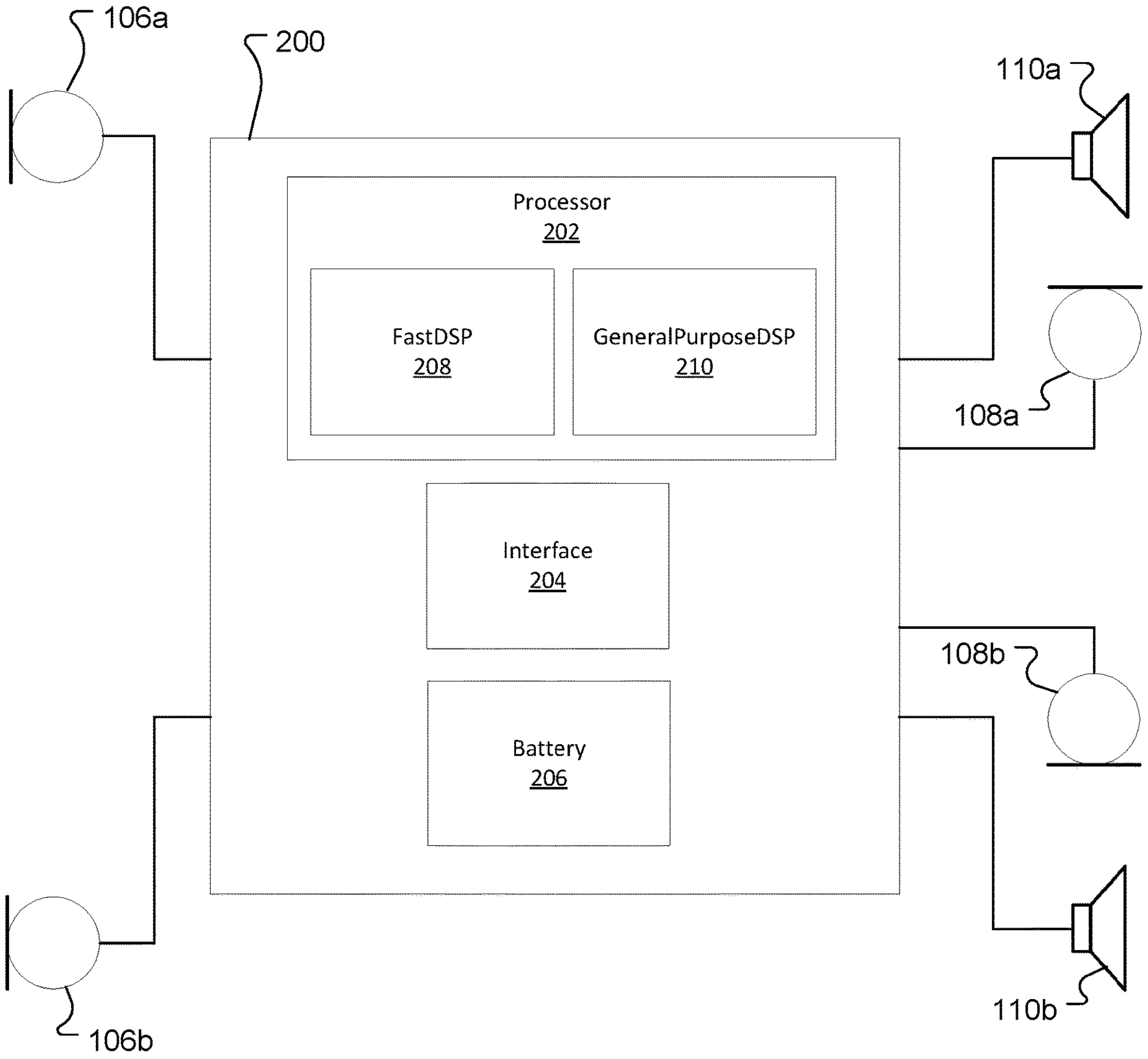
FIG. 2 is a schematic block diagram of an example audio processing system that may be incorporated into various audio systems.

Shown in FIG. 2 is an example of a processing unit 200 that may be physically housed somewhere on or within the headset 100. The processing unit 200 may include a processor 202, an audio interface 204, and a battery 206. As shown, the processor 202 comprises a plurality of processors including a fast digital signal processor (fastDSP) 208 and a general purpose digital signal processor (generalpurposeDSP) 210. The processing unit 200 may be coupled to one or more feedforward microphone(s) 106, driver(s) 110, and/or feedback microphone(s) 108, in various examples. In various examples, the interface 204 may be a wired or a wireless interface for receiving audio signals, such as a playback audio signal or program content signal, and may include further interface functionality, such as a user interface for receiving user inputs and/or configuration options. In various examples, the battery 206 may be replaceable and/or rechargeable. In various examples, the processing unit 200 may be powered via means other than or in addition to the battery 206, such as by a wired power supply or the like. In some examples, a system may be designed for noise reduction only and may not include an interface 204 to receive a playback signal.

Figure 3:
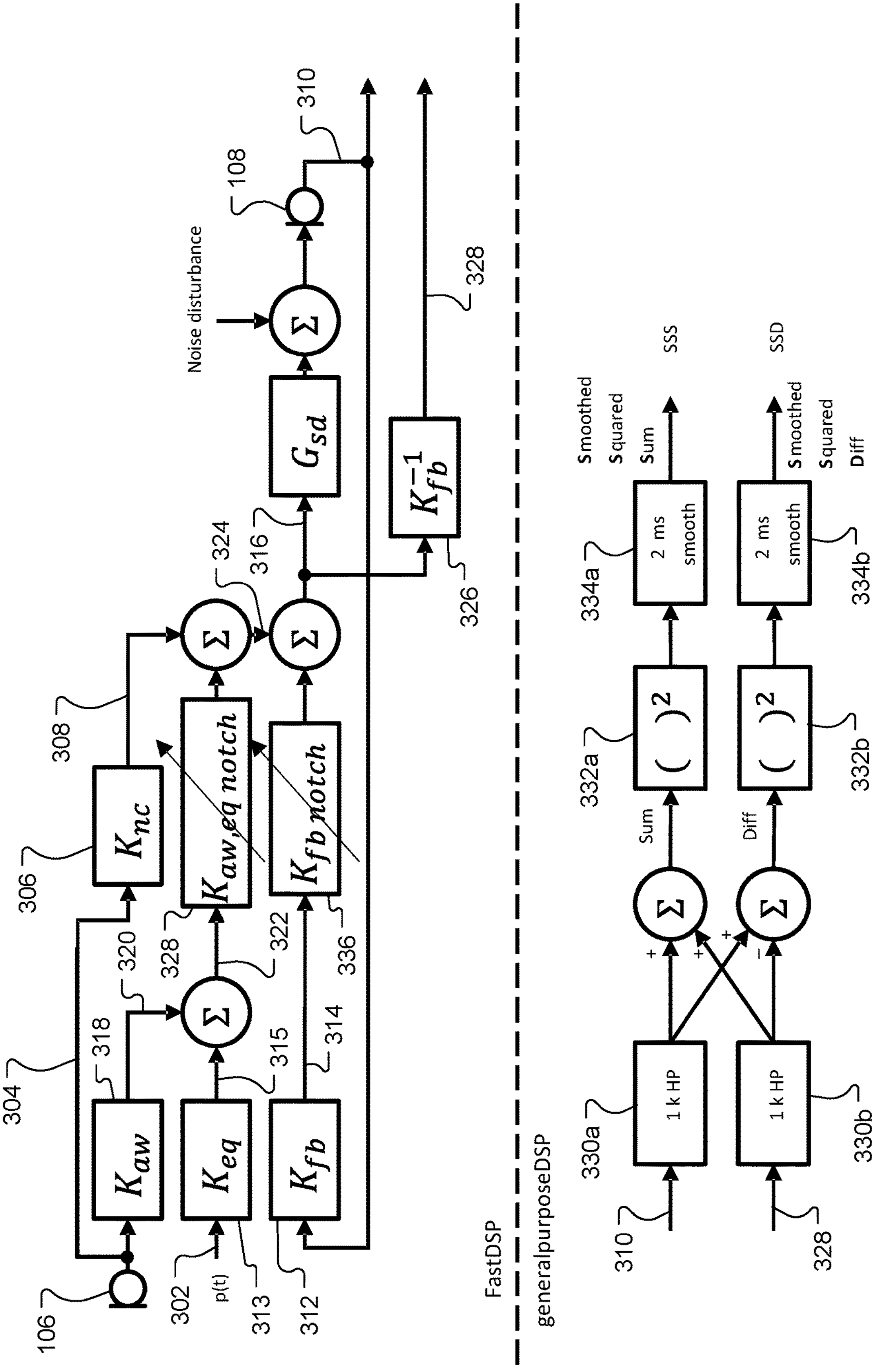
FIG. 3 is a schematic diagram of a prior art system for instability detection.

FIG. 3 illustrates a system and method of processing microphone signals to reduce noise reaching the user's ear. FIG. 3 presents a simplified schematic diagram to highlight features of a noise reduction system. Various examples of a complete system may include amplifiers, analog-to-digital conversion (ADC), digital-to-analog conversion (DAC), equalization, sub-band separation and synthesis, and other signal processing or the like. In some examples, a playback signal 302, p(t), may be received to be rendered as an acoustic signal by the driver 110. The feedforward microphone 106 may provide a feedforward signal 304 that is processed by a feedforward filter 306, having a feedforward transfer function, $K_{nc}$, to produce a feedforward anti-noise signal 308. The feedback microphone 108 may provide a feedback signal 310 that is processed by a feedback filter 312, having a feedback transfer function, $K_{fb}$, to produce a feedback anti-noise signal 314. In certain examples, any of the playback signal 302, the feedforward anti-noise signal 308, and/or the feedback anti-noise signal 314 may be combined to generate a driver signal 316 (a/k/a "driver command signal" or "command signal") to be provided to the driver 110. In some cases, the playback signal may be equalized via an equalization filter 313 to provide an equalized playback signal 315 that is combined with the feedforward anti-noise signal 308 and the feedback anti-noise signal 314 to generate the driver signal 316. In various examples, any of the playback signal 302, the feedforward anti-noise signal 308, and/or the feedback anti-noise signal 314 may be omitted and/or the components necessary to support any of these signals may not be included in a particular implementation of a system.

In some implementations, the headphone 100 can include a feature that may be referred to as "aware mode." In some cases, this feature may also be called "hear-through" mode, "talk-through" mode, or "pass-through" mode. In such a mode, the feedforward microphone 106 or other detection means can be used to detect external sounds that the user might want to hear, and the ANR system can be configured to pass such sounds through to be reproduced by the driver 110. In some cases, the sensor used for the aware mode feature can be a sensor, such as a microphone, that is separate from the feedforward microphone 106.

In some implementations, the ANR system can allow a user to control the amount of ambient noise passed through the device while maintaining ANR functionalities, such as described in U.S. Pat. No. 10,096,313 which is incorporated herein by reference in its entirety. For example, to enable a user to control the amount of ambient noise passed through the device, an adjustable gain may be implemented, such as by selecting a set of coefficients for an aware mode filter 318. Alternatively or additionally, an adjustable gain may be implemented using a variable gain amplifier (not shown) arranged in series with the aware mode filter 318. In some cases, an adjustable gain may be implemented using a combination of adjustments to a variable gain amplifier (not shown) and the aware mode filter 318, each disposed in the aware mode signal flow path.

In the example illustrated in FIG. 3, the feedforward microphone signal 304 is filtered with the aware mode filter 318 to provide an aware mode signal 320, which is combined with the equalized playback signal 315, the feedforward anti-noise signal 308 and the feedback anti-noise signal 314 to provide the driver signal 316. As shown in FIG. 3, the aware mode signal 320 may first be combined with the equalized playback signal 315 to provide a first combined signal 322. Then, the first combined signal 322 may be combined with the feedforward anti-noise signal 308 to provide a second combined signal 324, which may then be combined with the feedback anti-noise signal 308 to provide the driver signal 316.

The electrical and physical system shown in FIG. 3 exhibits a plant transfer function, $G_{sd}$, characterizing the transfer of the driver signal 316 through to the feedback signal 310. In other words, the response of the feedback signal 310 to the driver signal 316 is characterized by the plant transfer function, $G_{sd}$. The system of the feedback noise reduction loop is therefore characterized by the combined (loop) transfer function, $G_{sd}K_{fb}$.

When the loop transfer function, $G_{sd}K_{fb}$, becomes equal to unity, $G_{sd}K_{fb}=1$, at one or more frequencies, the loop system may diverge, causing at least one frequency component of the driver signal 316 to progressively increase in amplitude. This may be perceived by the user as an audible artifact, such as a tone or squealing, and may reach a limit at a maximum amplitude the driver 110 is capable of producing, which may be extremely loud. Accordingly, when such a condition exists, the feedback noise reduction system may be described as unstable.

To detect an impending squeal/instability, the prior art system of FIG. 3 compares the feedback microphone's input against a filtered version of the driver command signal 316. In that regard, the driver command signal 316 is filtered via an inverse feedback filter 326 having a transfer function, $K_{fb}^{-1}$, that is the inverse of the feedback filter transfer function, $K_{fb}$, and that inverse filtered signal 328 is compared to the feedback microphone signal 310 to detect instability.

The comparison operations are off loaded to the general-purposeDSP 210. First, the signals are each filtered via respective high-pass filters 330*a*, 330*b*. Then, a sum and a difference are calculated for those high-pass filtered signals. The sum and difference signals are then squared 332*a*, 332*b* and smoothed 334*a*, 334*b*. Finally, the smoothed squared sum (SSS) and the smoothed squared difference (SSD) are compared. In one specific example, instability is detected when the following two conditions are satisfied:

SSS>−15 dB; and

SSS/SSD>9 dB for 2 milliseconds (ms)

If an instability is detected, a notch filter 336 is activated, which reduces the gain of the controller in a sensitive frequency region so that the whole system will be stable even if the nozzle is blocked. When the system is stable, the feedback notch filter 336 operates as a simple pass-through filter. The system also includes a second notch filter 338.

Because the aware mode signal 320 and the equalized audio signal 315 are injected after the feedback filter 312, the feedback filter 312 is actually trying to reject the playback signal 315 and aware mode content (input audio). The equalization filter 313 is designed to account for the fact that the controller is naturally trying to reject that input. Simply put, the equalization filter 313 essentially boosts the gain until the sound is right. However, when the feedback filter 312 is effectively changed by activating the feedback notch filter 336 the input audio path needs to be modified to account for that change, and that is the function of the second notch filter 338.

There are two undesirable aspects of this existing system. First, the inverse feedback filter 326 must be the same size as the feedback filter 312—it has the same number of biquads. Unfortunately, there are a limited number of instructions that can fit on the fast processor 208, and it may be preferable to use those instructions for other things. Second, when an instability is detected and the notch filter 336 is added to the to the controller, the transfer function, $K_{fb}$, of the feedback filter is effectively changed. As a result, the filtered driver signal 328 is no longer valid as a detection signal because it relied on $K_{fb}^{-1}$, which is not updated to match the change to $K_{fb}$ when the notch filter 336 is added. The transfer function, $K_{fb}^{-1}$, of the inverse feedback filter 326 could also be updated when the notch filter 336 is added, but that would require using up more instructions.

Figure 4:
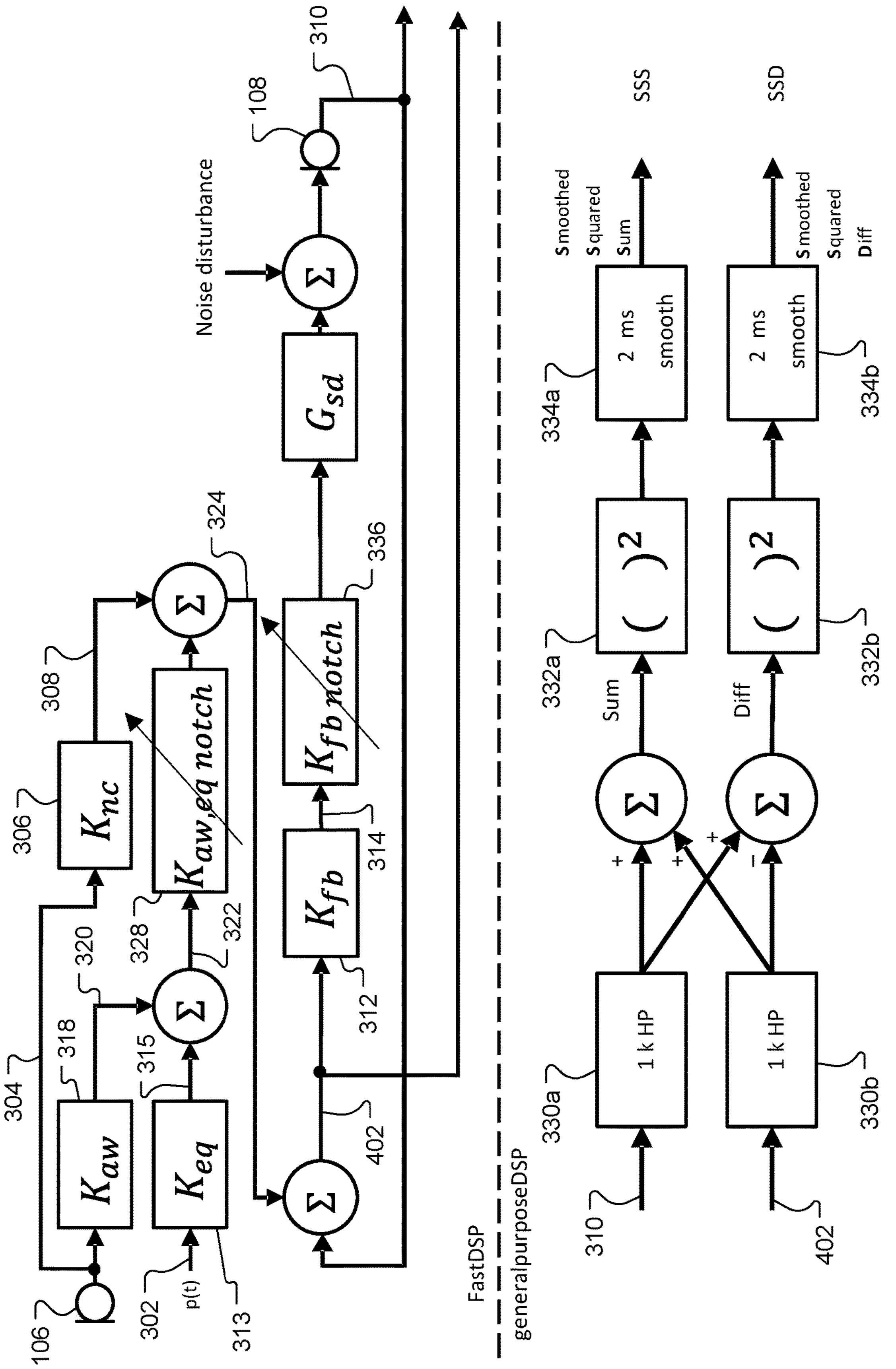
FIG. 4 is a schematic diagram of an example system for instability detection according to the present disclosure.

FIG. 4 illustrates an implementation that may help to address these shortcomings. In this new configuration, various components of the driver signal, including the feedforward noise cancellation signal, the aware mode signal, and the equalized audio signal, are combined and that combined signal 324 is injected (summed with the feedback microphone signal 310) upstream of the feedback filter 310 to provide a reference signal 402. This will require us to design different filters because now all of these signals have to go through the feedback filter 312, but that is straight forward filter design. This simple change allows us to move the tap for the reference signal upstream of the feedback filter 312, obviating the need for the inverse filter 326 (FIG. 3). Put another way, this is essentially the same as taking the signal at the output of the feedback filter 312 and running it through the inverse filter 326, as was done in the prior system. So, this change basically allows the instability detection to be performed without the need for the inverse filter 326 (FIG. 3). That is the first benefit.

The second benefit is that because the detection is not influenced by the feedback filter 312 it should still be valid even when the feedback filter 312 is effectively changed via activation of the feedback notch filter 336. That is, because the reference signal 402 is tapped before it goes through the feedback filter 312, changing the effective transfer function of the feedback filter 312 does not change the meaning of the signal 402. So, the reference signal 402 can still usefully be compared to the feedback microphone signal 310.

All of the processing for the comparison remains the same, only the reference signal 402 is different. Operations are rearranged in the fastDSP 208 so that equivalent signals can be obtained without having to use the extra inverse feedback filter 326. The change to the command injection point does not change anything that is running in the generalpurposeDSP 210.

Figure 5:
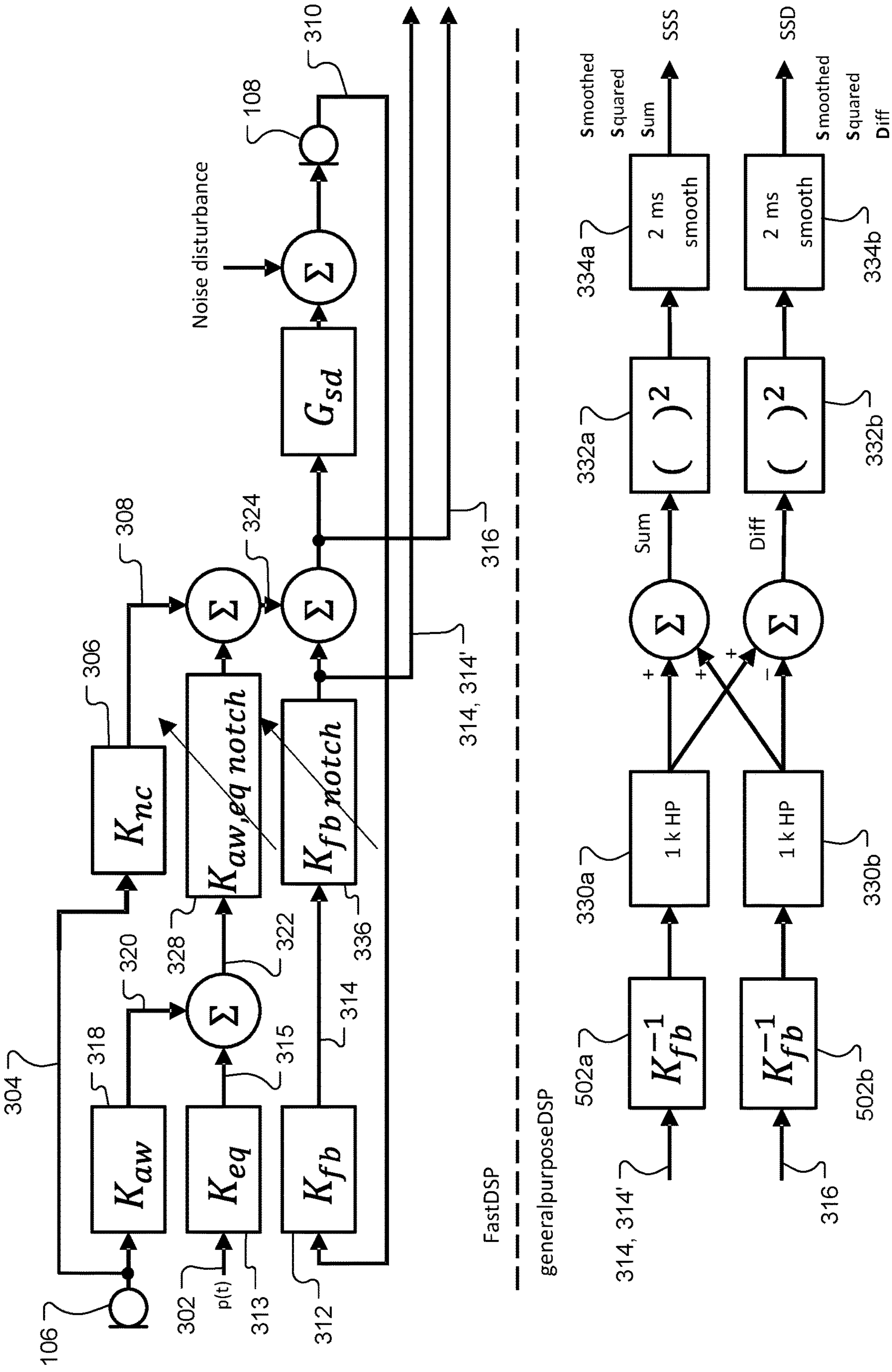
FIG. 5 is a schematic diagram of another example system for instability detection according to the present disclosure.

FIG. 5 illustrates another implementation. In this configuration, rather than moving the injection point of the other driver signal components, the feedback mic signal 310 is tapped after it is filtered by the feedback filter 312; i.e., the feedback anti-noise signal 314 is tapped for the comparison with the driver signal 316. As shown in FIG. 5, the feedback anti-noise signal 314 may be tapped downstream of the feedback notch filter 336, such that a notch filtered feedback anti-noise signal 314' is tapped for comparison to the driver signal 316 when the feedback notch filter 336 is activated. It may still be desirable to have the feedback anti-noise signal 314 and the driver signal 316 spectrally shaped so that they look like the unfiltered feedback microphone signal, and to do that respective inverse feedback filters 502*a*, 502*b* may be used but those filters do not have to be implemented on the fastDSP 208. Those inverse feedback filters 502*a*, 502*b* can be approximate—since they are identical and applied to both the feedback anti-noise signal 314 and the driver signal 316, respectively, they do not need to match the feedback filter 312 exactly. The issue with the existing system is that if the transfer function, $K_{fb}$, of the feedback filter 312 is effectively changed via activation of the feedback notch filter 336, the inverse feedback filter 326 (FIG. 3) no longer matches that new effective transfer function, $K_{fb}$. However, if both signals are grabbed after the feedback loop, they will still be matching or not matching regardless of such a change to transfer function, $K_{fb}$. In some instances, it may be desirable to shape the feedback anti-noise signal 314 and the driver signal 316 so they look like the unfiltered feedback microphone signal 310. To achieve that, an approximate inverse feedback filter 502*a*, 502*b* can be applied and that can be done on the slower processor 210 without utilizing valuable instructions on the fast processor 208.

All of the processing for the comparison remains essentially the same except for the addition of the inverse feedback filters 502*a*, 502*b* in the processing path on the slow (general purpose) processor.

The above-described aspects and examples provide numerous potential benefits to a personal audio device that includes feedback noise reduction. Stability criteria for feedback control may be defined by an engineer at the controller design stage, and various considerations assume a limited range of variation (of system characteristics) over the lifetime of the system. For example, driver output and microphone sensitivity may vary over time and contribute to the electroacoustic transfer function between the driver and the feedback microphone. Further variability may impact design criteria, such as production variation, head-to-head variation, variation in user handling, and environmental factors. Any such variations may cause stability constraints to be violated, and designers must conventionally take a conservative approach to feedback system design to ensure that instability is avoided. Such an instability may cause the noise reduction system to add undesired signal components rather than reduce them, thus conventional design practices may take highly conservative approaches to avoid an instability occurring, potentially at severe costs to system performance.

However, aspects and examples of detecting feedback instability, as described herein, allow corrective action to be taken to remove the instability when such condition occurs, allowing system designers to design systems that operate under conditions nearer to a boundary of instability, and thus achieve improved performance over a wider feedback bandwidth. Aspects and examples herein allow reliable detection if or when the instability boundary is crossed. For example, in an in-ear noise cancelling headphone, a user's handling may commonly block the "nozzle" of an earbud (e.g., a finger momentarily covering the audio port), which may cause an extreme physical change to the electroacoustic coupling between the driver and the feedback microphone. Conventional systems need to be designed to avoid instability even with a blocked nozzle, but instability detection in accord with aspects and examples described herein allow the feedback controller or processor to be designed without the "blocked nozzle" condition as a constraint. Accordingly, systems and methods herein may more than double the range of bandwidth in which noise reduction by a feedback processor may be effective.

In various examples, any of the functions of the systems and methods described herein may be implemented or carried out in a digital signal processor (DSP), a microprocessor, a logic controller, logic circuits, and the like, or any combination of these, and may include analog circuit components and/or other components with respect to any particular implementation. Functions and components disclosed herein may operate in the digital domain and certain examples include analog-to-digital (ADC) conversion of analog signals generated by microphones, despite the lack of illustration of ADC's in the various figures. Such ADC functionality may be incorporated in or otherwise internal to a signal processor. Any suitable hardware and/or software, including firmware and the like, may be configured to carry out or implement components of the aspects and examples disclosed herein, and various implementations of aspects and examples may include components and/or functionality in addition to those disclosed.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

A number of implementations have been described. Nevertheless, it will be understood that additional modifications may be made without departing from the scope of the inventive concepts described herein, and, accordingly, other implementations are within the scope of the following claims.

What is claimed is:

1. A method comprising:

combining a playback audio signal with a feedback signal from a feedback microphone to provide a first combined signal;

filtering the first combined signal with a feedback filter to provide a driver command signal; and providing the driver command signal to an acoustic transducer for transduction to acoustic energy; and comparing the first combined signal with the feedback signal to detect a feedback instability based upon the comparison.

2. The method of claim 1, wherein combining the playback audio signal with the feedback signal comprises filtering the playback audio signal with an equalization filter to provide a filtered playback signal and combining the filtered playback signal with the feedback signal to provide the first combined signal.

3. The method of claim 2, wherein combining the playback audio signal with the feedback signal further comprises filtering a feedforward signal from a feedforward microphone with an aware mode filter to provide an aware mode signal; and combining the aware mode signal, the filtered playback signal, and the feedback signal to provide the first combined signal.

4. The method of claim 3, wherein combining the playback signal with the feedback signal further comprises filtering the feedforward signal with a feedforward filter to provide a feedforward noise cancellation signal; and combining the feedforward noise cancellation signal, the aware mode signal, and the filtered playback signal with the feedback signal to provide the first combined signal.

5. The method of claim 4, wherein combining the playback signal with the feedback signal further comprises combining the feedforward noise cancellation signal, the aware mode signal, and the filtered playback signal to provide a second combined signal; and combining the second combined signal with the feedback signal to provide the first combined signal.

6. The method of claim 1, further comprising, in response to detecting the feedback instability, filtering the driver command signal with a first notch filter to provide a filtered driver command signal, and providing the filtered driver command signal to an acoustic transducer for transduction to acoustic energy.

7. The method of claim 6, further comprising, in response to detecting the feedback instability, filtering the playback audio signal with a second notch filter.

8. The method of claim 1, wherein the steps of combining the playback audio signal with the feedback signal and filtering the first combined signal with the feedback filter are performed on a first processing component and the step of comparing the first combined signal with the feedback signal to detect the feedback instability is performed on a second processing component.

9. A method comprising:

filtering a playback audio signal with an equalization filter to provide a filtered playback signal;

filtering a feedforward signal from a feedforward microphone with an aware mode filter to provide an aware mode signal; and combining the aware mode signal and the filtered playback signal to provide a first combined signal;

filtering the feedforward signal with a feedforward filter to provide a feedforward noise cancellation signal; and combining the feedforward noise cancellation signal and the first combined signal to provide a second combined signal;

combining the second combined signal with a feedback signal from a feedback microphone to provide a third combined signal;

filtering the third combined signal with a feedback filter to provide a driver command signal; and providing the driver command signal to an acoustic transducer for transduction to acoustic energy; and comparing the third combined signal with the feedback signal to detect a feedback instability based upon the comparison.

10. A method comprising:

filtering a feedback signal from a feedback microphone with a feedback noise cancellation filter to provide a feedback noise cancellation signal the feedback noise cancellation signal being related to the feedback signal by a first transfer function;

combining a playback audio signal with the feedback noise cancellation signal to provide a driver command signal;

providing the driver command signal to an acoustic transducer for transduction to acoustic energy;

filtering the driver command signal with a first inverse filter to provide a reference signal, the first inverse filter configured to have a second transfer function that is the inverse of the first transfer function;

filtering the feedback noise cancellation signal with a second inverse filter to provide an estimate of the feedback signal, the second inverse filter configured to have a third transfer function that is the inverse of the first transfer function; and comparing the reference signal with the estimate of the feedback signal to detect a feedback instability based upon the comparison.

11. The method of claim 10, wherein combining a playback audio signal with the feedback noise cancellation signal comprises filtering the playback audio signal with an equalization filter to provide a filtered playback signal and combining the filtered playback signal with the feedback noise cancellation signal to provide the driver command signal.

12. The method of claim 11, wherein combining the playback audio signal with the feedback noise cancellation signal further comprises filtering a feedforward signal from a feedforward microphone with an aware mode filter to provide an aware mode signal; and combining the aware mode signal, the filtered playback signal, and the feedback noise cancellation signal to provide the driver command signal.

13. The method of claim 12, wherein combining the playback signal with the feedback noise cancellation signal further comprises filtering the feedforward signal with a feedforward filter to provide a feedforward noise cancellation signal; and combining the feedforward noise cancellation signal, the aware mode signal, and the filtered playback signal with the feedback noise cancellation signal to provide the driver command signal.

14. The method of claim 13, wherein combining the playback signal with the feedback noise cancellation signal further comprises combining the feedforward noise cancellation signal, the aware mode signal, and the filtered playback signal to provide a first combined signal; and combining the first combined signal with the feedback noise cancellation signal to provide the driver command signal.

15. The method of claim 10, further comprising, in response to detecting the feedback instability, filtering the feedback noise cancellation signal with a first notch filter to provide a filtered feedback noise cancellation signal.

16. The method of claim 15, further comprising, in response to detecting the feedback instability, filtering the playback audio signal with a second notch filter.

17. The method of claim 10, wherein the steps of filtering the feedback signal and combining the playback audio signal with the feedback noise cancellation signal are performed on a first processing component and the steps of filtering the driver command signal with the first inverse filter; filtering the feedback noise cancellation signal with the second inverse filter; and comparing the reference signal with the estimate of the feedback signal are performed on a second processing component.

18. A method comprising:

filtering a playback audio signal with an equalization filter to provide a filtered playback signal;

filtering a feedforward signal from a feedforward microphone with an aware mode filter to provide an aware mode signal; and combining the aware mode signal and the filtered playback signal to provide a first combined signal;

filtering the feedforward signal with a feedforward filter to provide a feedforward noise cancellation signal; and combining the feedforward noise cancellation signal and the first combined signal to provide a second combined signal;

filtering a feedback signal from a feedback microphone with a feedback noise cancellation filter to provide a feedback noise cancellation signal, the feedback noise cancellation signal being related to the feedback signal by a first transfer function;

combining the second combined signal with the feedback noise cancellation signal to provide a driver command signal;

providing the driver command signal to an acoustic transducer for transduction to acoustic energy;

filtering the driver command signal with a first inverse filter to provide a reference signal, the first inverse filter configured to have a second transfer function that is the inverse of the first transfer function;

filtering the feedback noise cancellation signal with a second inverse filter to provide an estimate of the feedback signal, the second inverse filter configured to have a third transfer function that is the inverse of the first transfer function; and comparing the reference signal with the estimate of the feedback signal to detect a feedback instability based upon the comparison.

* * * * *